United States Patent
Kang et al.

(10) Patent No.: US 10,747,384 B1
(45) Date of Patent: Aug. 18, 2020

(54) SINGLE LAYER CAPACITIVE TOUCH MATRIX

(71) Applicant: STMicroelectronics Asia Pacific Pte Ltd, Singapore (SG)

(72) Inventors: Tae-gil Kang, Seoul (KR); Aiden Jeon, Seoul (KR)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/528,824

(22) Filed: Aug. 1, 2019

(51) Int. Cl.
  *G06F 3/044* (2006.01)
  *G06F 3/0488* (2013.01)

(52) U.S. Cl.
  CPC ............ *G06F 3/044* (2013.01); *G06F 3/0488* (2013.01); *G06F 2203/04104* (2013.01)

(58) Field of Classification Search
  CPC ......... G06F 3/044; G06F 3/045; G06F 3/0418
  USPC .................................................. 345/174, 178
  See application file for complete search history.

(56) References Cited

U.S. PATENT DOCUMENTS

| 10,120,509 B2* | 11/2018 | Chandran ............ G06F 3/0418 |
| 2012/0306802 A1 | 12/2012 | McCracken |
| 2014/0071082 A1 | 3/2014 | Singh et al. |
| 2015/0062093 A1 | 3/2015 | Ksondzyk et al. |
| 2017/0075496 A1* | 3/2017 | Rosenberg ............ G06F 3/0418 |
| 2019/0042024 A1 | 2/2019 | Tsai et al. |

FOREIGN PATENT DOCUMENTS

WO 2015107516 A1 7/2015

OTHER PUBLICATIONS

Peng, Tao et al: "Finger-Heating Effect in Mutual Capacitive Touch Sensor Design," EDN Network, Jul. 26, 2013, 7 (pages).

* cited by examiner

*Primary Examiner* — Calvin C Ma
(74) *Attorney, Agent, or Firm* — Crowe & Dunlevy

(57) ABSTRACT

A capacitive touch matrix has first conductive row elements spaced apart from one another, and first row interconnection circuitry electrically connects the first conductive row elements. Second conductive row elements are spaced apart from one another, and second row interconnection circuitry electrically connects the second conductive row elements. First conductive column elements are positioned between two adjacent ones of the first conductive row elements, the first conductive column elements being spaced apart from one another. Second conductive column elements are positioned in a same column as the first conductive column elements and between the two adjacent ones of the first conductive row elements, the second conductive column elements being spaced apart from one another. First column interconnection circuitry electrically connects each first conductive column element, and second column interconnection circuitry electrically connects each conductive column element. The conductive elements and interconnection circuitries are coplanar with one another.

22 Claims, 6 Drawing Sheets

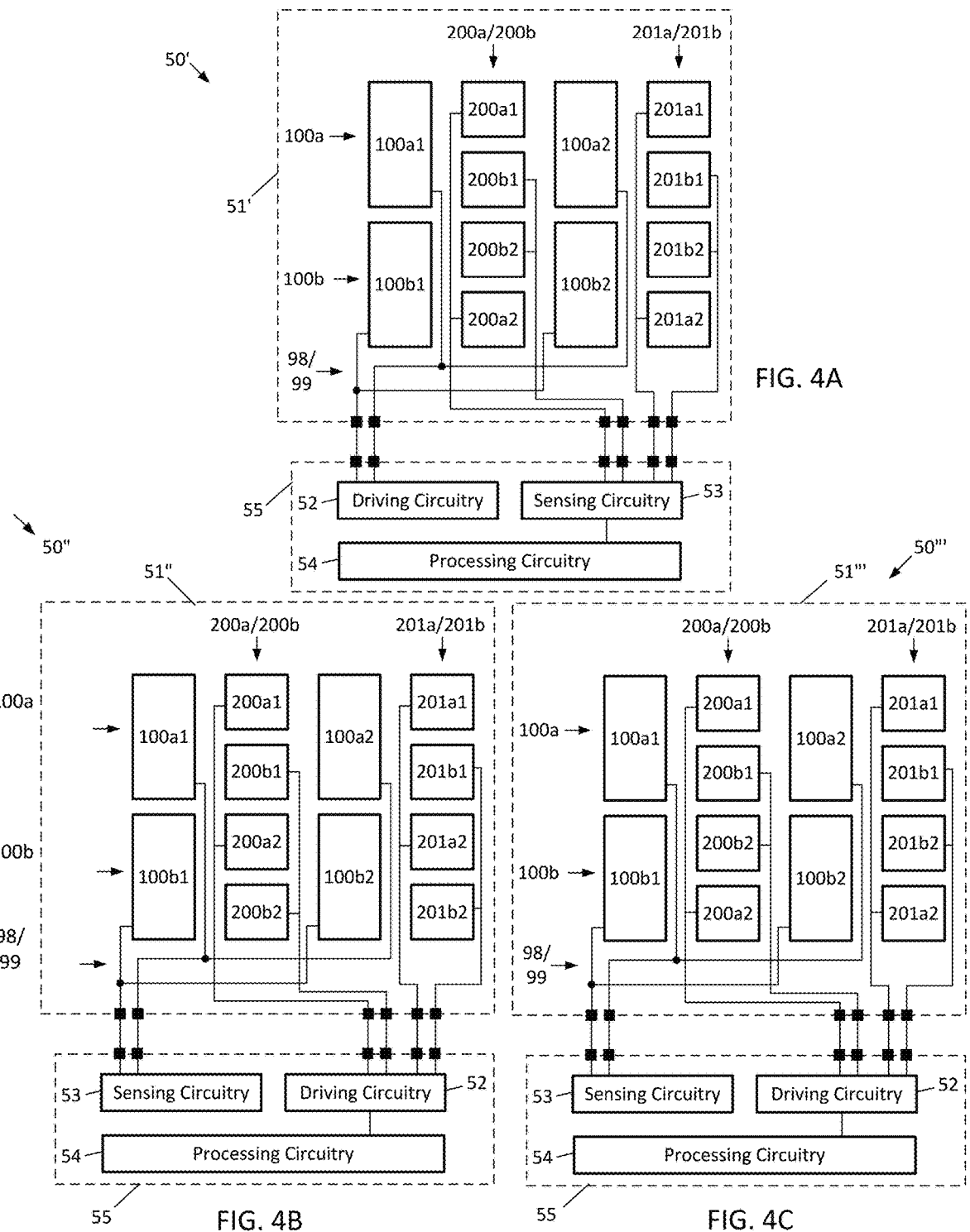

SINGLE LAYER CAPACITIVE TOUCH MATRIX

TECHNICAL FIELD

This application is directed to the field of capacitive touch sensing and, in particular, to a thin single layer capacitive touch matrix for use in capacitive touch sensing applications.

BACKGROUND

Touch screens are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

A common capacitive touch sensing technique that may be performed on touch screens is mutual capacitance sensing. As shown in FIG. 1A, in mutual capacitance sensing, a drive or transmit signal is applied from a touch screen controller to a subset of the lines referred to as drive or transmit lines, and capacitance values are measured at a subset of the lines referred to as sense or receive lines, with it being understood that in this specific example the receive lines cross the transmit lines in a spaced apart fashion therefrom. Each crossing of transmit line and receive line forms a capacitive node. Since bringing a finger or conductive stylus near the surface of the touch screen changes the local electric field, this causes a reduction in the capacitance between the transmit lines and the receive lines (the "mutual" capacitance), and the capacitance change at every individual capacitive node can be measured to accurately determine the touch location. Therefore, the output of mutual capacitance sensing is a two-dimensional matrix of values, with one value for each capacitive node.

The conductive lines collectively can be referred to as a capacitive touch matrix. One way in which these lines can be arranged is to have the transmit lines be perpendicular to the receive lines and spaced apart from (not co-planar with) the receive lines, as shown in FIG. 1B.

Another way the conductive lines can be arranged is into diamond shapes, as shown in FIG. 1C. Here, the transmit lines and receive lines are diamond shaped, with one (either the transmit lines or receive lines) being located within one plane, and with the other being generally located in the same plane but with a wire or bridge extending through another plane to provide for spaced apart intersections between the transmit lines and receive lines. As can be seen in FIG. 1C, the lines labeled as X-ITO extend within a single plane, while the lines labeled as Y-ITO have portions extending into a second plane to cross the lines labeled as X-ITO.

While the capacitive touch matrix arrangements of FIGS. 1B-1C provide for accurate touch sensing, they have drawbacks in that they can be more expensive to produce than desired, have a lower manufacturing yield than desired, are thicker than desired (due to the capacitive touch matrix requiring more than a single layer), and may lead to the touch screen they are incorporated into having larger bezels than desired. As such, additional development is needed.

SUMMARY

In an embodiment, an electronic device disclosed herein includes a capacitive touch matrix. The capacitive touch matrix includes first and second conductive row units. The first conductive row unit includes a plurality of first conductive row elements spaced apart from one another along a first direction and first row interconnection circuitry electrically connected to each of the plurality of first conductive row elements and electrically connecting each of the plurality of first conductive row elements to one another. The second conductive row unit includes a plurality of second conductive row elements spaced apart from one another along the first direction and second row interconnection circuitry electrically connected to each of the plurality of second conductive row elements and electrically connecting each of the plurality of second conductive row elements to one another.

The capacitive touch matrix also includes a first conductive column unit. The first conductive column unit includes a plurality of first conductive column elements positioned between two adjacent ones of the plurality of first conductive row elements, the plurality of first conductive column elements being spaced apart from one another along a second direction different than the first direction. The first conductive column unit also includes a plurality of second conductive column elements arranged in a same column as the plurality of first conductive column elements and also positioned between the two adjacent ones of the plurality of first conductive row elements, the plurality of second conductive column elements being spaced apart from one another along the second direction.

First column interconnection circuitry is electrically connected to each of the plurality of first conductive column elements and electrically connects each of the plurality of first conductive column elements to one another. Second column interconnection circuitry is electrically connected to each of the plurality of second conductive column elements and electrically connects each of the plurality of second conductive column elements to one another. The first conductive row unit, second conductive row unit, and first conductive column unit are coplanar with one another.

Ones of the plurality of second conductive column elements may be interdigitated with ones of the plurality of first conductive column elements. Indeed, ones of the plurality of second conductive column elements may be interdigitated with ones of the plurality of first conductive column elements such that each of the plurality of second conductive column elements is positioned between two of the plurality of first conductive column elements.

As an alternative, the plurality of first conductive column elements and the plurality of second conductive column elements may be arranged into pairs such that a pair of ones of the plurality of second conductive column elements is positioned between two pairs of ones of the plurality of first conductive column elements.

BRIEF DESCRIPTION OF THE DRAWINGS

FIGS. 4A-4C are alternate configurations of the capacitive touch matrix of FIG. 2.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
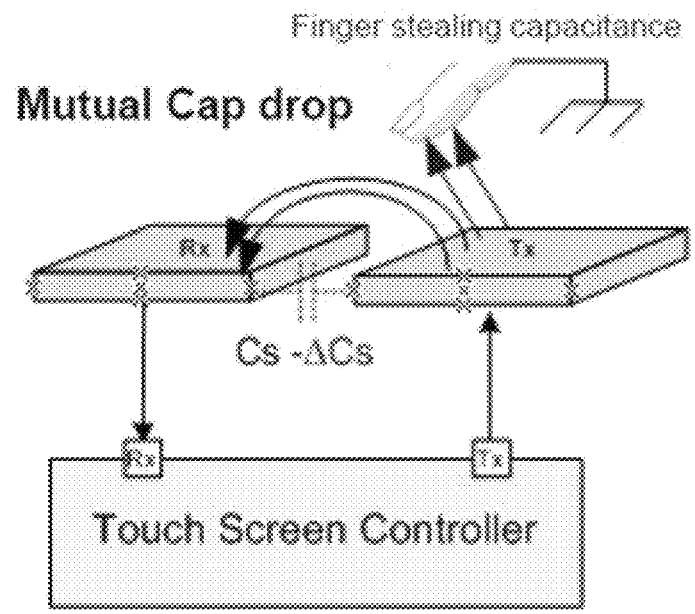
FIG. 1A is a diagram of two prior art touch sensors illustrating mutual capacitance touch sensing.
Figure 1B:
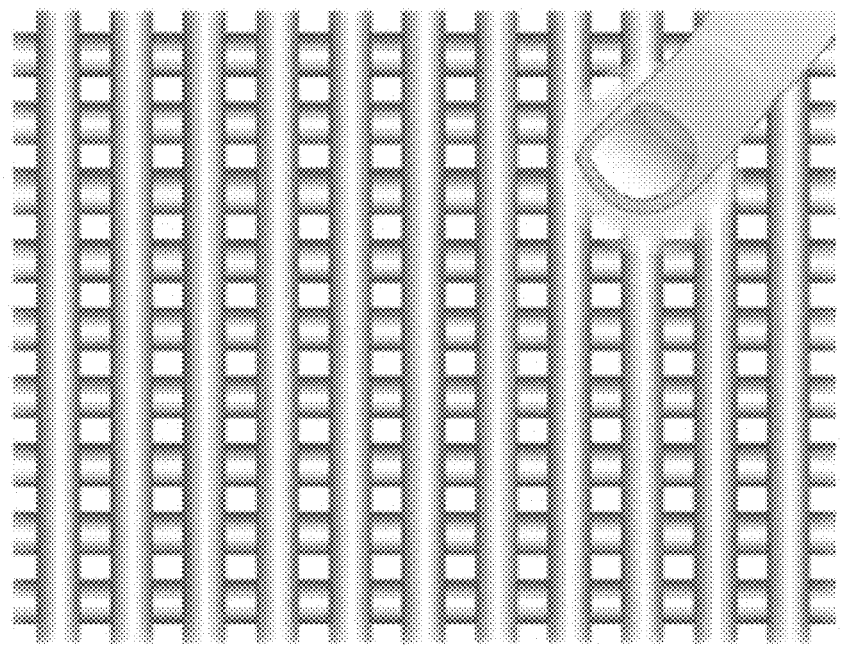
FIG. 1B is a diagram of a standard bar pattern capacitive touch matrix.
Figure 1C:
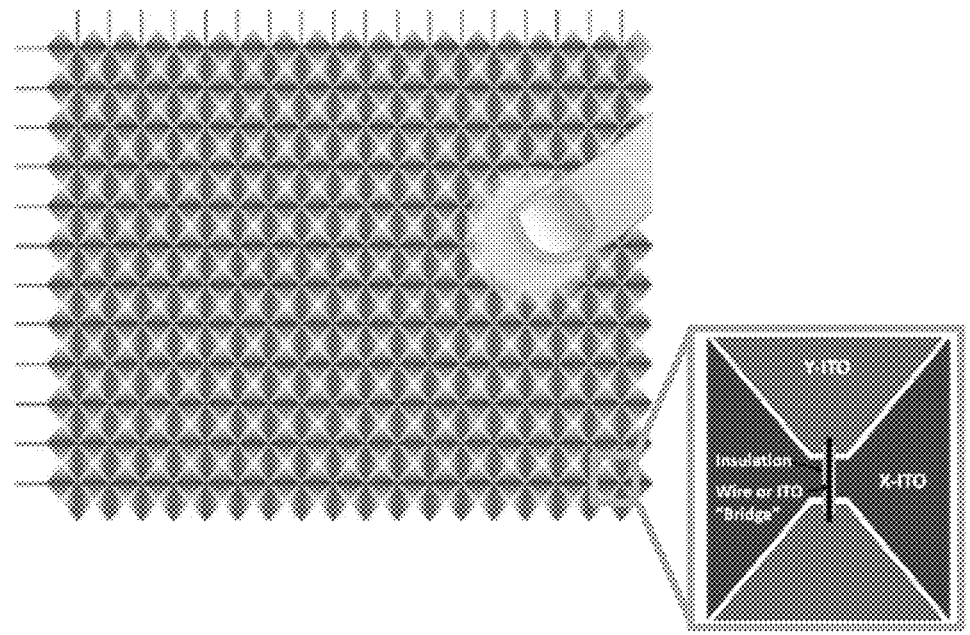
FIG. 1C is a diagram of a standard diamond pattern capacitive touch matrix.
Figure 2:
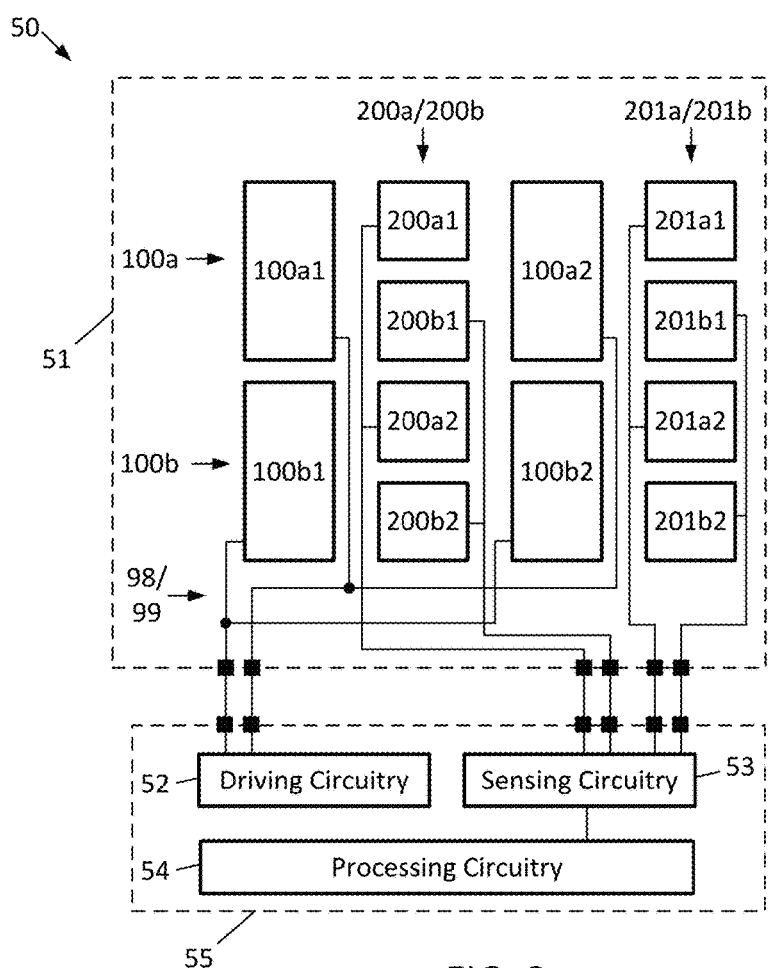
FIG. 2 is a block diagram of a first embodiment of a capacitive touch matrix disclosed herein as connected to a touch sensing controller.

Now described with reference to FIG. 2 is a first embodiment of an electronic device 50 incorporating a capacitive touch matrix 51 connected to a touch screen controller 55 integrated circuit.

The capacitive touch matrix 51 is implemented in a single layer, and illustratively includes rows 100a-100b and columns 200a-200b, 201a-201b for ease of viewing and understanding, with it being understood that in an actual implementation there may be any number of rows and columns.

Each row 100a-100b includes multiple conductive row elements 100a1-100a2 and 100b1-100b2 spaced apart from one another along a first direction (i.e., the X-direction), but electrically connected to one another. For example, row 100a includes conductive row elements 100a1 and 100a2, each of which is identically rectangularly shaped and sized, while row 100b includes conductive row elements 100b1 and 100b2, each of which is also identically rectangularly shaped and sized. In this example, the conductive row elements 100a1-100a2 and 100b1-100b2 are identically rectangularly shaped to one another and identically sized with one another, but are physically discontinuous with each other. Note that each conductive row element 100a1-100a2 and 100b1-100b2 has row interconnection circuitry 98 extending in a same direction therefrom to connect to driving circuitry 52 within the touch screen controller, and that it is only through this interconnection circuitry that the conductive row elements 100a1-100a2 are electrically connected to form the first row 100a and that the conductive row elements 100b1-100b2 are electrically connected to form the second row 100b. The rows 100a-100b extend in the X-direction (with respect to the drawing figure), while the row interconnection circuitry 98 extends in the Y-direction (with respect to the drawing figure) that is perpendicular to the X direction.

Note that the columns 200a and 200b are illustrated as a single physical column, but two electrically isolated columns, and are therefore labeled as columns 200a and 200b.

Each column 200a-200b and 201a-201b includes multiple conductive column elements 200a1-200a2, 200b1-200b2 and 201a1-201a2, 201b1-201b2 spaced apart from each other along a second direction perpendicular to the first direction. The conductive column elements 200a1-200a2 of column 200a are electrically connected to one another, the conductive column elements 200b1-200b2 of column 200b are electrically connected to one another, the conductive column elements 201a1-201a2 of column 201a are electrically connected to one another, and the conductive column elements 201b1-201b2 of column 201b are electrically connected to one another.

For example, column 200a includes conductive column elements 200a1 and 200a2, each of which is identically rectangularly shaped and sized, while column 200b includes conductive column elements 200b1 and 200b2, each of which is also identically rectangularly shaped and sized, and column 201a includes conductive column elements 201a1 and 201a2, each of which is identically rectangularly shaped and sized, while column 201b includes conductive column elements 201b1 and 201b2, each of which is also identically rectangularly shaped and sized. In this example, the conductive column elements 200a1-200a2, 200b1-200b2, 201a1-201a2, and 201b1-201b2 are identically rectangularly shaped to one another and identically sized with one another, but are physically discontinuous with each other.

The columns 200a-200b are located between conductive row elements of the rows 100a-100b. For example, the conductive column elements 200a1 and 200b1 are located between (bordered by) the conductive row elements 100a1 and 100a2 in the positive and negative X-directions, while the conductive column elements 200a2 and 200b2 are located between (bordered by) the conductive row elements 100b1 and 100b2 in the positive and negative X-directions.

Each conductive column element 200a1-200a2, 200b1-200b2, 201a1-201a2, and 201b1-201b2 has associated column interconnection circuitry 99 extending in a same direction therefrom to connect to sensing circuitry 53 within the touch screen controller, and that it is only through this interconnection circuitry 99 that the conductive column elements 200a1-200a2 are electrically connected to form the column 200a, that the conductive column elements 200b1-200b2 are electrically connected to form the column 200b, that the conductive column elements 201a1-201a2 are electrically connected to form the column 201a, and that the conductive column elements 201b1-201b2 are electrically connected to form the column 201b. The columns 200a-200b and 201a-200b extend in the Y-direction (with respect to the drawing figure), and the column interconnection circuitry 99 also extends in the Y-direction (with respect to the drawing figure).

As seen in the capacitive touch matrix 51, the columns 200a-200b are interdigitated with one another, meaning that the conductive column element 200b1 is bordered by the conductive column elements 200a1 and 200a2 in the positive and negative Y-directions, and that the conductive column element 200a2 is bordered by the conductive column elements 200b1 and 200b2 in the positive and negative Y-directions, etc.

It can be seen that in this example, there are twice as many electrical columns 200a, 200b, 201a, 201b as there are electrical rows (keeping in mind that columns 200a and 200b are not electrically connected to one another, despite the interleaving of their components), and that the individual conductive column elements have an area of no larger than half the area of the individual conductive row elements.

Stated another way, for each conductive row element, there are two conductive column elements.

The rows 100a-100b are coplanar with, and in a same layer as, each other. The columns 200a-200b and 201a-201b are coplanar with, and in a same layer as, each other. In addition, the rows 100a-100b are coplanar with, and in a same layer as, the columns 200a-200b and 201a-201b. The row interconnection circuitry 98 and column interconnection circuitry 99 are coplanar with, and in a same layer as, each other. In addition, the row interconnection circuitry 98 and column interconnection circuitry 99 is coplanar with, and in a same layer as, the rows 100a-100b and columns 200a-200b and 201a-201b.

Note that the row interconnection circuitry 98 and column interconnection circuitry 99 both extend in the same direction (the negative Y-direction with respect to the drawing figure) so that all interconnections emerge from a same side of the capacitive touch matrix 51, which helps enable formation of touch screen displays with minimal to no bezels on the other three sides of the capacitive touch matrix 51.

In operation, the driving circuitry 52 applies a drive signal to the rows 100a-100b, and capacitance values are measured at the columns 200a-200b and 201a-201b by the sensing circuitry 53. Since bringing a finger or conductive stylus near the surface of the sensor changes the local electric field, this causes a reduction in the mutual capacitance between the rows 100a-100b lines and the columns 200a-200b and 201a-201b, and the capacitance change at every individual point on the grid can be measured to accurately determine the touch location.

Figure 3A:
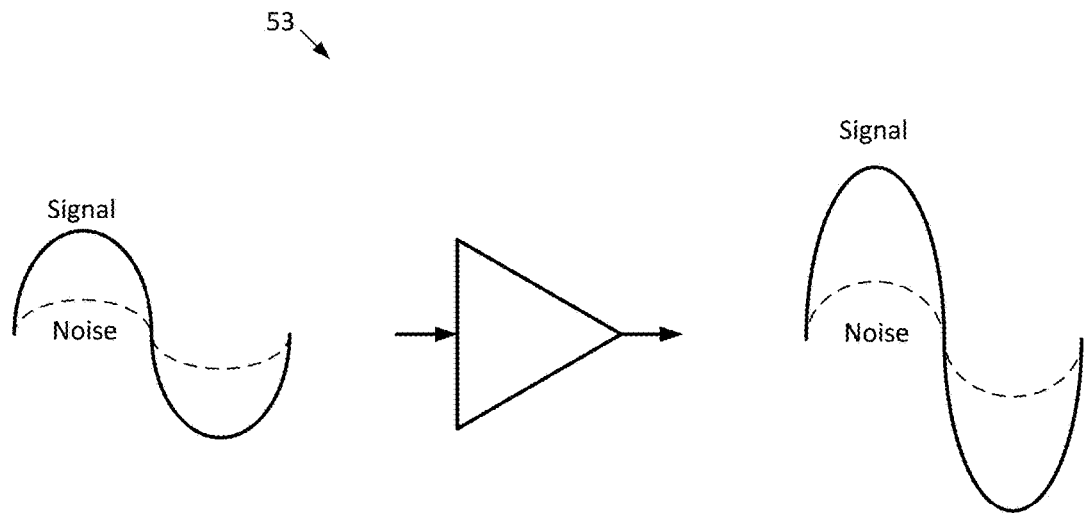
FIG. 3A is a block diagram showing single ended mutual capacitance touch sensing performed by sensing circuitry such as that contained in FIG. 2.
Figure 3B:
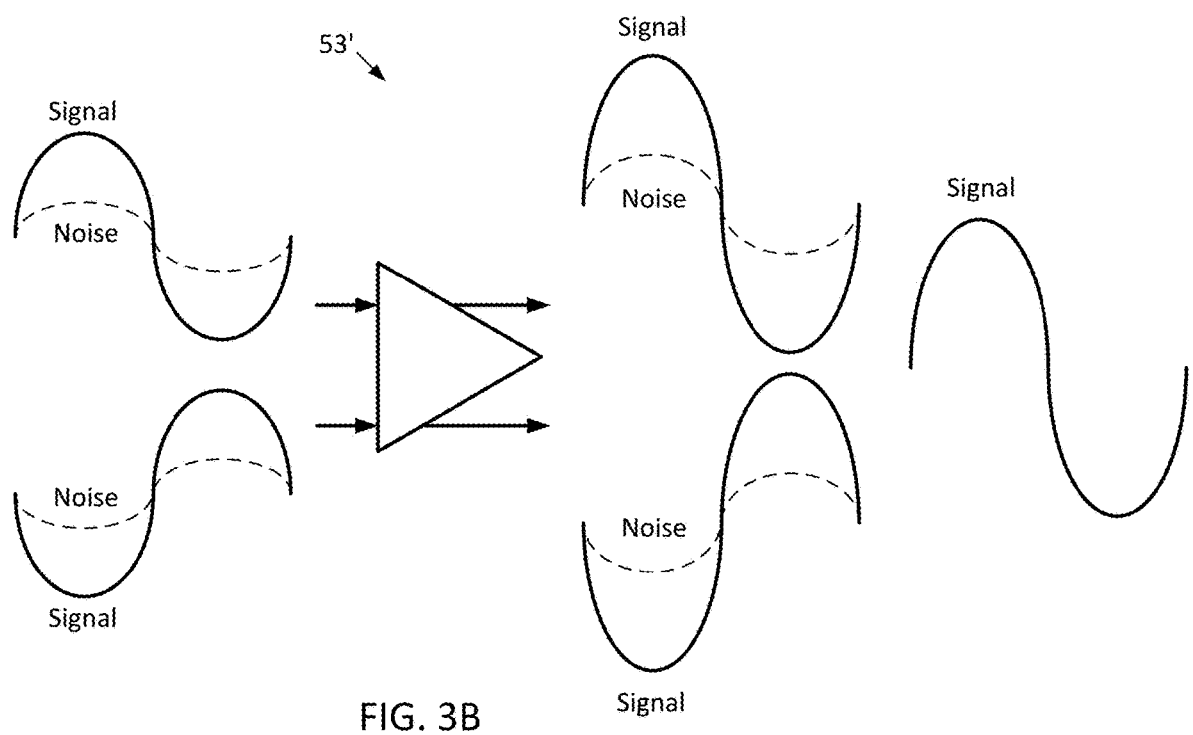
FIG. 3B is a block diagram showing differential mutual capacitance touch sensing performed by sensing circuitry such as that contained in FIG. 2.

The sensing circuitry 53 may use single ended sensing by amplifying the signal at each column 200a-200b and 201a-201b, as shown in FIG. 3A. While this may be simple, it has the drawback of amplifying the desired signal as well as noise (such as display noise from a display layer associated with the capacitive touch matrix 51). Therefore, the sensing circuitry 53' may alternatively use differential sensing to amplify the difference in the signal at two adjacent columns 200a-200b and 201a-201b as shown in FIG. 3B, which has the advantage of amplifying the desired signal but rejecting the noise.

An alternative configuration for the capacitive touch matrix 51' is shown in FIG. 4A. As compared to the capacitive touch matrix 51 of FIG. 2, notice that here the conductive column elements of the columns 200a-200b and 201a-201b are arranged into interdigitated pairs instead of interdigitated singles. For example, conductive column elements 200b1-200b2 are adjacent to one another and bordered in the positive and negative Y-directions (with respect to the drawing figure) by the conductive column elements 200a1 and 200a2.

In another alternative configuration for a capacitive touch matrix 51" shown in FIG. 4B, the arrangement of the conductive elements of the rows 100a-100b and 101a-101b is the same as in the capacitive touch matrix 51 of FIG. 2, but here the conductive row elements 100a1-100a2 and 100b1-100b2 are coupled to the sensing circuitry 53, while the conductive column elements 200a1-200a2, 200b1-200b2, 201a1-201a2, and 201b1-201b2 are coupled to the driving circuitry 52.

In the configuration of a capacitive touch matrix 51'" shown in FIG. 4C, the arrangement of the conductive elements of the rows 100a-100b and 101a-101b is the same as in the capacitive touch matrix 50' of FIG. 4A, but here the conductive row elements 100a1-100a2 and 100b1-100b2 are coupled to the sensing circuitry 53, while the conductive column elements 200a1-200a2, 200b1-200b2, 201a1-201a2, and 201b1-201b2 are coupled to the driving circuitry 52.

Figure 5:
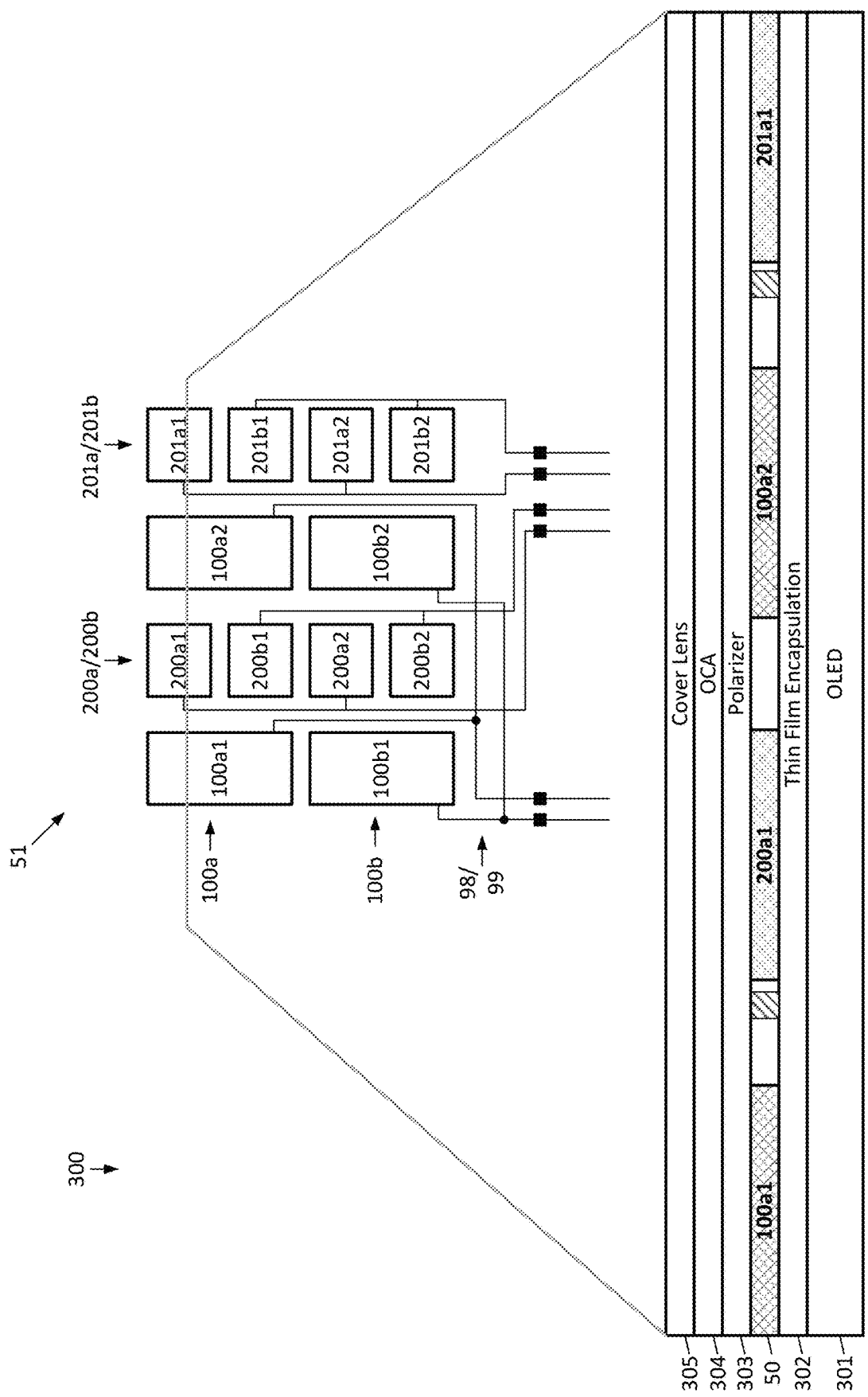
FIG. 5 is a diagrammatical cross sectional view of the capacitive touch matrix of FIG. 2.

A cross sectional view of the capacitive touch matrix 51 of FIG. 2, when implemented into a touch screen 300, is shown in FIG. 5. Here, the bottommost layer is a display layer 301 (illustrated as an organic light emitting diode layer), with a thin film layer 302 thereon to protect the display layer 301 and to provide a substrate onto which the capacitive touch matrix 51 is placed. A light polarizing filter 303 is stacked on the capacitive touch matrix, and an optically clear adhesive layer 304 bonds a cover lens 305 to the light polarizing filter 303 to complete the touch screen 300.

Figure 6:
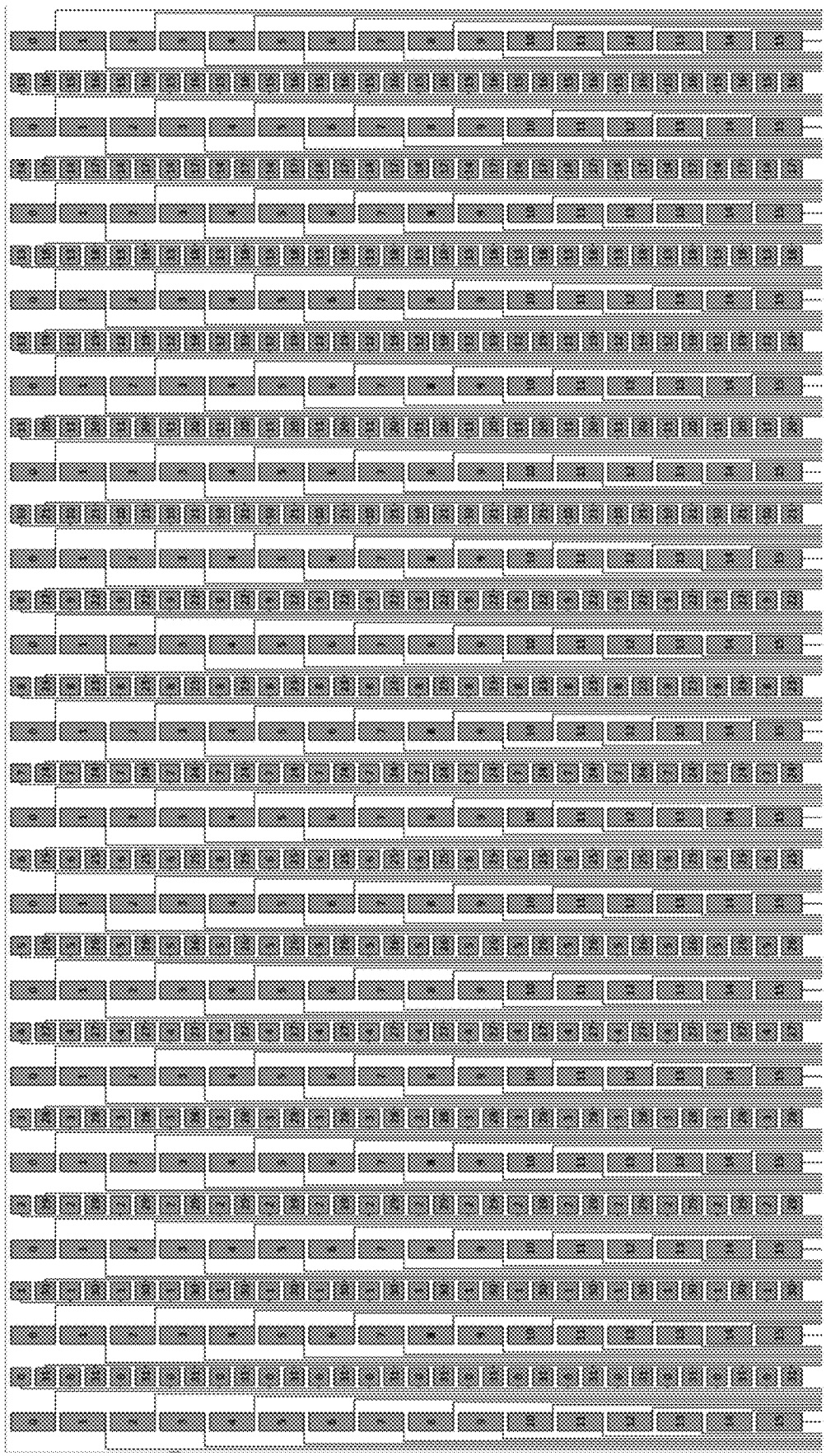
FIG. 6 is a diagrammatical real world view of the arrangement of the rows and columns of the capacitive touch matrix of FIG. 2.

As stated, the examples shown in FIGS. 2 and 4A-4C are simplified in that they contain fewer electrical rows and columns than an actual implementation. A diagrammatical representing of an actual implementation is shown in FIG. 6. Here, the electrical rows are labeled by channel number (e.g., channel "0" running from left to right beginning at the top left of the drawing figure, channel "1" running from left to right beginning below channel "0", etc), with it being understood that different row elements having the same channel number are electrically connected to one another. The electrical columns are also labeled by channel number (e.g., channels "0" and "31" running from top to bottom beginning after the first channel "0" row element, channels "1" and "30" running from top to bottom beginning after the second "0" row element, etc), with it being understood that different column elements having the same channel number are electrically connected to one another. Notice that in this example, the electrical columns are interdigitated one a one to one basis (e.g., column 0 and column 30 are interdigitated with one another, with the first column element 31 being between two adjacent column elements 30).

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:
1. An electronic device, comprising:
a capacitive touch matrix comprising:
   a first conductive row unit comprising:
      a plurality of first conductive row elements spaced apart from one another along a first direction; and
      first row interconnection circuitry electrically connected to each of the plurality of first conductive row elements and electrically connecting each of the plurality of first conductive row elements to one another;
   a second conductive row unit comprising:
      a plurality of second conductive row elements spaced apart from one another along the first direction; and
      second row interconnection circuitry electrically connected to each of the plurality of second conductive row elements and electrically connecting each of the plurality of second conductive row elements to one another; and
   a first conductive column unit comprising:
      a plurality of first conductive column elements positioned between two adjacent ones of the plurality of first conductive row elements, the plurality of first conductive column elements being spaced apart from one another along a second direction different than the first direction;

a plurality of second conductive column elements arranged in a same column as the plurality of first conductive column elements and also positioned between the two adjacent ones of the plurality of first conductive row elements, the plurality of second conductive column elements being spaced apart from one another along the second direction;

first column interconnection circuitry electrically connected to each of the plurality of first conductive column elements and electrically connecting each of the plurality of first conductive column elements to one another; and second column interconnection circuitry electrically connected to each of the plurality of second conductive column elements and electrically connecting each of the plurality of second conductive column elements to one another;

wherein the first conductive row unit, second conductive row unit, and first conductive column unit are coplanar with one another.

2. The electronic device of claim 1, wherein ones of the plurality of second conductive column elements are interdigitated with ones of the plurality of first conductive column elements.

3. The electronic device of claim 1, wherein ones of the plurality of second conductive column elements are interdigitated with ones of the plurality of first conductive column elements such that each of the plurality of second conductive column elements is positioned between two of the plurality of first conductive column elements.

4. The electronic device of claim 1, wherein the plurality of first conductive column elements and the plurality of second conductive column elements are arranged into pairs such that a pair of the plurality of second conductive column elements is positioned between two pairs of the plurality of first conductive column elements.

5. The electronic device of claim 1, wherein the plurality of first conductive row elements, plurality of first conductive column elements, and plurality of second conductive column elements are equal in number.

6. The electronic device of claim 1, further comprising driving circuitry coupled to the first row interconnection circuitry to apply a drive signal thereto, sensing circuitry coupled to the first column interconnection circuitry and second column interconnection circuitry, and processing circuitry coupled to the sensing circuitry and configured to determine capacitances between the plurality of first conductive row elements and the first and second pluralities of conductive column elements that represent touch sensing information indicating a location of a touch to the capacitive touch matrix.

7. The electronic device of claim 6, wherein the sensing circuitry is configured to amplify signals on the first and second column interconnection circuitries.

8. The electronic device of claim 6, wherein the sensing circuitry is configured to differentially amplify signals on the first and second column interconnection circuitries so as to amplify the signals but cancel out noise.

9. The electronic device of claim 1, further comprising driving circuitry coupled to the first column interconnection circuitry and second column interconnection circuitry to apply a drive signal thereto, sensing circuitry coupled to the first row interconnection circuitry and second row interconnection circuitry, and processing circuitry coupled to the sensing circuitry and configured to determine capacitances between the first and second pluralities of conductive column elements and the first and second pluralities of conductive row elements that represent touch sensing information indicating a location of a touch to the capacitive touch matrix.

10. The electronic device of claim 9, wherein the sensing circuitry is configured to amplify signals on the first and second row interconnection circuitries.

11. The electronic device of claim 9, wherein the sensing circuitry is configured to differentially amplify signals on the first and second column interconnection circuitries so as to amplify the signals but cancel out noise.

12. The electronic device of claim 1, wherein the first row interconnection circuitry, second row interconnection circuitry, first column interconnection circuitry, and second column interconnection circuitry all extend toward a same side of the capacitive touch matrix.

13. The electronic device of claim 1, wherein the first and second pluralities of conductive row elements are rectangularly shaped.

14. The electronic device of claim 1, wherein the plurality of first conductive column elements and plurality of second conductive column elements are rectangularly shaped.

15. The electronic device of claim 1, wherein the plurality of first conductive row elements, the plurality of second conductive row elements, plurality of first conductive column elements, and plurality of second conductive column elements are rectangularly shaped.

16. The electronic device of claim 1, wherein each of the plurality of first conductive row elements is at least double in area than a corresponding one of the plurality of first conductive column elements.

17. The electronic device of claim 1, wherein each of the plurality of first conductive column elements is no more than half an area of a corresponding one of the plurality of first conductive row elements.

18. A capacitive touch matrix, comprising:

a first conductive row unit comprising:

a plurality of first conductive row elements extending along a first direction; and first row interconnection circuitry extending in a second direction from the plurality of first conductive elements and electrically connecting each of the plurality of first conductive row elements to one another, the second direction being different than the first direction;

a second conductive row unit comprising:

a plurality of second conductive row elements extending along the first direction; and second row interconnection circuitry extending in the second direction and electrically connecting each of the plurality of second conductive row elements to one another; and a first conductive column unit comprising:

a plurality of first conductive column elements extending along the second direction and positioned between two adjacent ones of the plurality of first conductive row elements;

a plurality of second conductive column elements extending along the second direction, arranged in a same column as the plurality of first conductive column elements, and also positioned between the two adjacent ones of the plurality of first conductive row elements;

first column interconnection circuitry extending in the second direction from the plurality of first conductive column elements and electrically connecting each of the plurality of first conductive column elements to one another; and second column interconnection circuitry extending in the second direction from the plurality of second conductive column elements and electrically connecting each of the plurality of second conductive column elements to one another;

wherein the first conductive row unit, second conductive row unit, and first conductive column unit are coplanar with one another.

19. The capacitive touch matrix of claim 18, wherein ones of the plurality of second conductive column elements are interdigitated with ones of the plurality of first conductive column elements.

20. The capacitive touch matrix of claim 18, wherein ones of the plurality of second conductive column elements are interdigitated with ones of the plurality of first conductive column elements such that each of the plurality of second conductive column elements is positioned between two of the plurality of first conductive column elements.

21. The capacitive touch matrix of claim 18, wherein the plurality of first conductive column elements and the plurality of second conductive column elements are arranged into pairs such that a pair of the plurality of second conductive column elements is positioned between two pairs of the plurality of first conductive column elements.

22. The capacitive touch matrix of claim 18, wherein the plurality of first conductive row elements, plurality of first conductive column elements, and plurality of second conductive column elements are equal in number.

* * * * *